Nov. 24, 1964  A. J. NELSON ETAL  3,158,708
ICING DETECTION APPARATUS AND SYSTEM
Filed Feb. 28, 1961  2 Sheets-Sheet 1
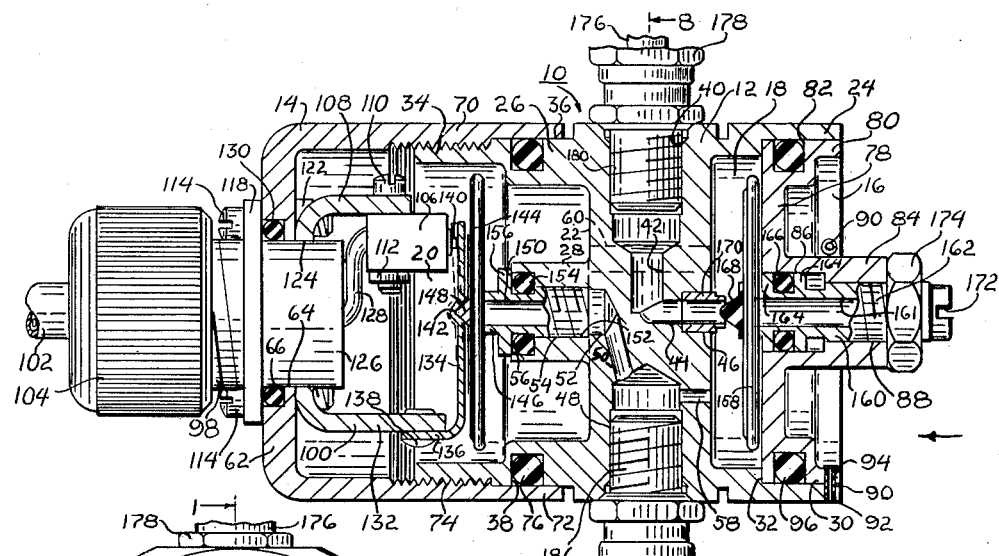

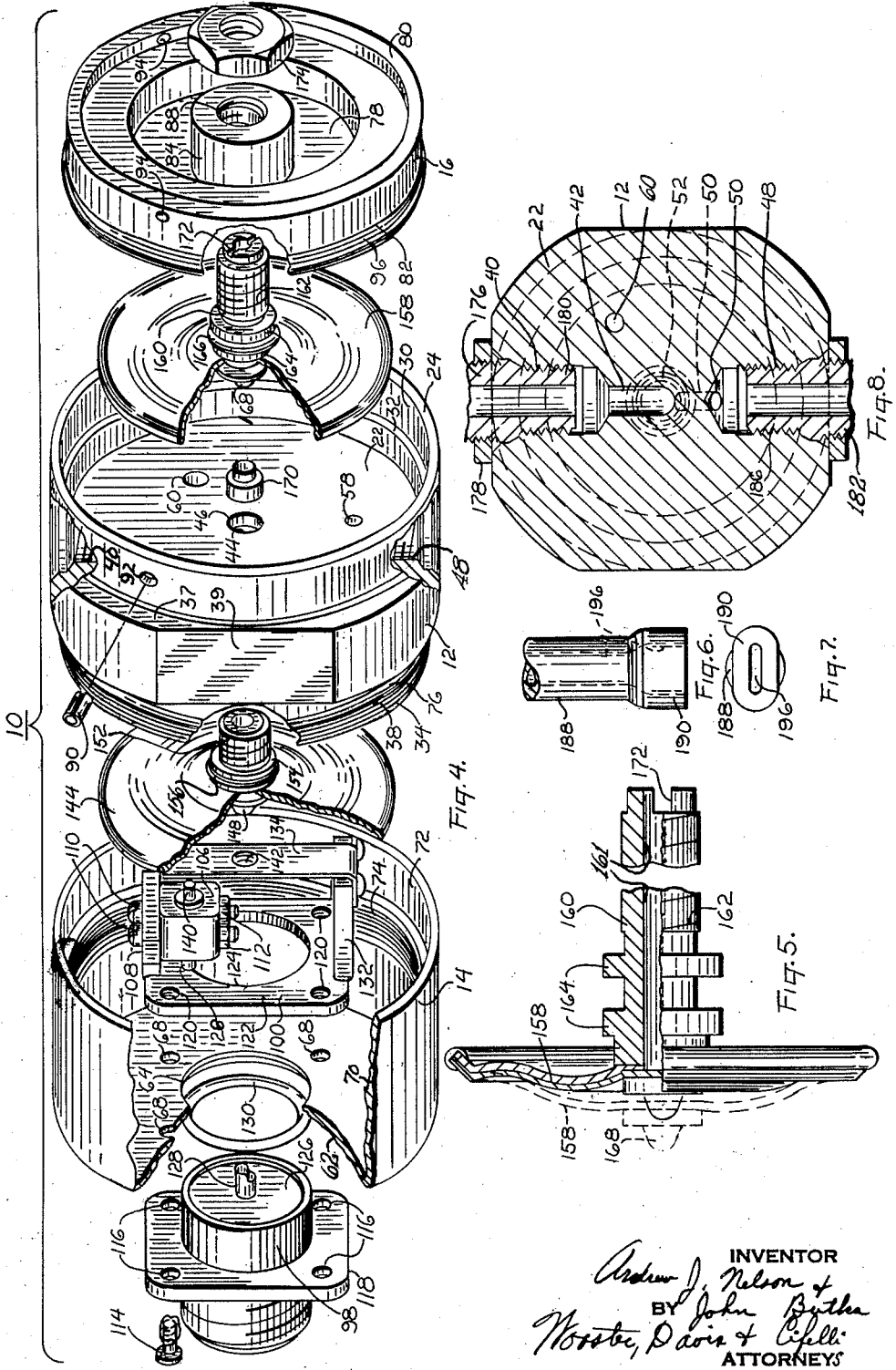

though our invention is useful in other applications, it will be primarily described as applied to the detection of ice formations in the carburetor of a fuel induction system of an aircraft internal combustion engine; however, other applications of the invention will be obvious therefrom and our invention is not limited to such an application.

United States Patent Office 3,158,708
Patented Nov. 24, 1964

3,158,708
ICING DETECTION APPARATUS AND SYSTEM
Andrew J. Nelson, Stratford, and John Butka, Trumbull, Conn., assignors to Eutkin Tool and Manufacturing Corporation, Milford, Conn., a corporation of Connecticut
Filed Feb. 28, 1961, Ser. No. 92,410
10 Claims. (Cl. 200—83)

This invention relates generally to apparatus and a system for the detection and indication of a deposit of a material, such as ice, at a particular location, and more particularly to the formation of ice in fuel induction systems of internal combustion engines, such as aircraft engines. Although our invention is useful in other applications, it will be primarily described as applied to the detection of ice formations in the carburetor of a fuel induction system of an aircraft internal combustion engine; however, other applications of the invention will be obvious therefrom and our invention is not limited to such an application.

It is well known in the aircraft art that under certain flight conditions ice may quickly form in the carburetor of an aircraft engine, resulting in reduction or complete loss of engine power. This, of course, is a serious safety hazard and the art has expended much effort and energy to solve this problem. It is known that the formation of ice in a fuel induction system depends upon air intake temperature, air humidity, and other factors. Nevertheless, most of the known carburetor ice formation detecting and indicating equipment responds only to air intake temperature. Such equipment is basically defective, for the air intake temperature is not a direct indicator of ice formation because of the other factors that contribute thereto. Therefore, under certain conditions the pilot is likely to actuate the de-icing equipment when it is not actually needed and this results in the lowering of engine efficiency. On the other hand, in some other circumstances the pilot is likely not to actuate the de-icing equipment when it is needed, and this may result in the power of the engine being impaired or lost due to carburetor ice formation at a critical time.

It is an object of the invention to provide an ice detection and indicating apparatus and system that are directly responsive to the actual formation of ice at a location being monitored, particularly in the carburetor of an aircraft internal combustion engine, which are extremely accurate and reliable in operation, and therefore, which permit safe engine operation at carburetor air intake temperatures relatively close to the freezing point, whereby detonation and wide fluctuation of air intake temperature is avoided, and combustion efficiency is improved.

It is another object of the invention to provide an improved switch and control unit that is relatively simple in construction, economical to produce, reliable in operation and readily installed in an ice detection and indicating system, and which comprises the bulk of such a system.

The objects of the invention are accomplished in one form by providing an improved vacuum-operated switch and control unit and an associated probe, and assembling the unit at a point of application by attaching it to a source of vacuum, such as the intake manifold of an internal combustion engine, and to the probe, and disposing the latter at the location being monitored for ice formation.

Other objects and further details of that which we believe to be novel and our invention will be clear from the following description and claims taken with the accompanying drawings, wherein:

FIG. 1 is a longitudinal vertical sectional view of the switch and control unit of our invention with some associated elements of our improved ice detection and indicating system taken substantially on line 1—1 of FIG. 2;

FIG. 2 is an end elevational view thereof looking in the direction of the arrow in FIG. 1;

FIG. 3 is a somewhat schematic view of an entire carburetor ice detection and indicating system application of our invention illustrating both the electrical wiring circuit and the air flow passageways;

FIG. 4 is an exploded view of the switch and control unit contemplated by our invention;

FIG. 5 is an enlarged side elevational view with portions broken away and shown in section of the pressure regulating capsule assembly;

FIG. 6 is a fragmentary enlarged side elevational view of the probe nozzle;

FIG. 7 is an end elevational view thereof; and

FIG. 8 is a sectional view taken substantially on line 8—8 of FIG. 1.

Our improved icing detection and indicating apparatus and system includes essentially a switch and control unit, appropriate tubing for connecting this unit to a source of vacuum, such as an engine intake manifold, and to a probe that is disposed at the location being monitored for the formation of ice, such as a carburetor, and appropriate electrical wiring for electrically connecting the unit to a source of electrical power and an indicating means. As disclosed herein, the apparatus and system will be described as including a warning indicating lamp which may be disposed at any convenient location where it may be observed and which is operated in an automatic controlled manner in response to the formation of ice at the location being monitored to indicate its presence by becoming illuminated. A person may then actuate separate de-icing equipment. It should be realized that, if desired, the unit may be arranged to automatically directly energize de-icing equipment in addition to or instead of illuminating the warning indicating lamp. The de-icing equipment forms no specific part of our invention, but may be of the type that introduces warm air or some antifreeze liquid, such as alcohol, into the fuel induction system if a carburetor is being monitored, or otherwise heat the portions of the location being monitored to melt the ice.

*General Organization of Switch and Control Unit*

The principal component of our improved apparatus and system comprises the switch and control unit 10, the construction of which can be most clearly understood by reference primarily to FIGS. 1 and 4. Unit 10 comprises a housing 12, a cover 14, and a cap 16, all of which may be conveniently made of an aluminum alloy and assembled into a self-contained unit that may be handled bodily as an accessory device and installed in otherwise existing environments, such as on aircraft internal combustion engines. When assembled, these parts essentially define a pressure regulating chamber 18 and a switch chamber 20, each of which houses additional elements to be described after the construction of the housing, cover and cap are fully described.

Housing 12 comprises a unitary body which is somewhat cylindrical in general outline and which includes an axially thick diametral central wall 22 have an axially extending cylindrical flange 24 formed at its periphery on one axial side, an axially oppositely extending cylindrical flange 26 formed at its periphery on its other axial side, and an axially extending short central tubular hub 28 formed on the latter side and spaced concentrically within the flange 26. The flange 24 has its free axial portion of reduced radial thickness to form an enlarged cylindrical opening 30 and an axially facing annular shoulder 32. The flange 26 has the exterior 34 of its free axial end threaded and the portion 36 adjacent thereto plain and of slightly reduced outer diameter relative to the central portion 37 of the housing, which may have flat lands 39 formed thereon to permit gripping by a tool to facilitate assembly or adjustment of the unit 10. An annular channel 38 is formed in the periphery of the plain portion 36.

The central wall 22 has an internally threaded radial port 40 formed therein on and open at one radial side thereof which communicates at its radially inner end with an aligned radial bore 42 that in turn communicates with a central axial bore 44 that terminates in an enlarged counterbore 46. Central wall 22 includes another internally threaded port 48 which is diametrically oppositely disposed and aligned with the port 40. Port 48 opens at its radially outer end to one side of the housing and communicates at its radially inner end with a radially inclined bore 50 that in turn communicates with an axial bore 52 that extends completely through the hub 28 and includes a threaded portion 54 and an enlarged annular recess 56 opening at its free end. As can be most clearly see in FIG. 1, the axial bores 44 and 52 are co-axial, but they are separated and extend in opposite axial directions. A non-centrally disposed axially extending port 58 extends from one side of the port 48 completely through the central wall 22 and opens to its axial side that forms part of the pressure regulating chamber 18 when the unit is fully assembled. A non-centrally disposed axially extending passage 60 extends completely through the central wall 22 and opens to both axial sides thereof.

The cover 14 is generally cup-shaped and includes a flat circular diametral wall 62 having a large central opening 64 formed therein having an adjacent annular enlarged recess 66 and a plurality of spaced small openings 68. The cover 14 also includes at its periphery an axially extending cylindrical flange 70 having its free end 72 of reduced thickness and an internal portion 74 thereof threaded. The cover 14 is arranged to support a number of elements and to be threadedly connected to the housing 12 by the interengagement of its threaded portion 74 with the threaded portion 34 of the housing. When so connected, an O-ring 76 may be disposed in the groove 38 in the housing and contact the cover flange portion 72 to effect a fluid-tight seal between the housing and cover. When the cover is assembled to the housing it defines the previously referred-to switch chamber 20. These parts may readily be axially adjusted relative to each other by turning the cover on the housing in either a clockwise or counterclockwise direction.

Cap 16 comprises a flat circular diametral wall 78 having a peripheral cylindrical flange 80 extending axially on one side with an annular groove 82 formed therein and a central axially extending tubular hub 84 formed on the same side thereof. The hub 84 includes a central plain bore 86 which communicates with a reduced diameter threaded bore 88. The cap 16 is arranged to be nonadjustably secured to the housing 12 by being received with the enlarged opening 30 thereof and to abut the housing shoulder 32 and be positioned thereby. The cap 16 may be rigidly, but removably, secured to the housing 12 by a plurality of roll pins 90 that are frictionally received in pairs of adjacent cooperating holes 92 and 94 formed, respectively, in the housing flange 24 and the cap flange 80. When the cap 16 is secured to the housing 12, the previously referred-to pressure regulating chamber 18 is defined generally by one side of the housing central wall 22, the housing flange 24 and the inner side of cap wall 78. An O-ring 96 is disposed in the groove 82 in the cap flange 80 and contacts an internal portion of the housing flange 24 at the opening 30 to effect a fluid-tight seal between the cap and housing.

The foregoing comprises a complete description of the individual construction of the housing 12, cover 14 and cap 16 and their assembly into a complete unit casing to form pressure regulating chamber 18 and switch chamber 20, with the cover 14 being axially adjustably mounted on the housing 12. A description of the elements which each of these parts supports to form a subassembly of the unit will now be set forth.

*Cover Sub-Assembly*

Cover 14 rigidly supports an electrical receptacle 98 and a switch mounting bracket 100. Receptacle 98 is an electrical wiring device of known construction which is utilized to permit the detachable electrical connection of an electrical connector 104 of an electrical supply cord 102 for the purpose of supplying electrical power to the electrical switch 106 that is mounted in switch chamber 20. Switch 106 is of the known miniature snap-acting type, commonly referred to as a microswitch, and is rigidly supported on the upper arm 108 of the switch mounting bracket 100 by a pair of bolts 110 and a pair of cooperating nuts 112. The switch mounting bracket 100 is rigidly supported by the cover wall 62 on the axially inner side thereof by a plurality of mounting screws 114 that pass through openings 116 formed in mounting flange 118 of the receptacle 98 and openings 68 formed in the radial wall 62 and are anchored in threaded openings 120 formed in the flat mounting wall 122 of the mounting bracket 100. The mounting wall 122 includes a large central opening 124 through which a body portion 126 of the receptacle 98 extends into the switch chamber 20, out of which an electrical cord 128 emanates that is electrically connected to the microswitch 106 in a known manner to supply electrical power thereto from the electrical supply cord 102, connector 104 and receptacle 98. An O-ring 130 is disposed in the recess 66 in cover wall 62 and has sealing contact with the receptacle body portion 126 to effect a fluid-tight seal. The lower arm 132 of the mounting bracket 100 rigidly supports switch actuating lever 134 at the latter's lower bent end 136, as by utilizing the rivets 138. The switch mounting bracket 100 may conveniently be made of an aluminum alloy, but the lever 134 is preferably made of a springy metal, such as a tempered stainless steel. The upper end of the lever 134 is disposed adjacent to the usual switch actuating button 140 of the microswitch 106, and intermediate its length the lever 134 is deformed so as to form a spherical offset 142 that opens to one axial side of it. It will, therefore, be apparent that the cover 14 directly supports the receptacle 98 and the switch mounting bracket 100, and indirectly supports through the latter the microswitch 106 and the switch actuating lever 134. All of these parts may conveniently be assembled into a subassembly prior to mounting the cap 14 on the housing 12.

*Housing Sub-Assembly*

The housing 12 supports a switch actuating capsule assembly on the switch side thereof which forms a part of switch chamber 20 when the housing and cover are assembled. This assembly comprises a switch capsule 144 that is supported on one side by a tubular bushing 146 and on its other side supports a conical button 148 which is disposed adjacent offset 142 when the switch capsule assembly is mounted on the housing 12 and the housing subassembly and the cover subassembly are assembled together. The switch capsule comprises a pair of contiguous nesting flexible metallic disk-like diaphragms, which may be made of stainless steel, that are secured at their peripheries, as by welding, and which are capable of being separated under certain conditions though they are constructed to inherently be biased toward their unseparated condition. The separated condition is referred to as the expanded condition of the capsule and the unseparated condition is referred to as the contracted condition. The button 148 may be metallic and brazed to one of the diaphragms centrally thereof, and the other diaphragm is centrally apertured and brazed to be bushing 146. The bushing 146 has a central passage 150 that communicates at one of its ends with the interior of the capsule through the aperture in said other diaphragm and at its other end with bore 52 of hub 28 when the bushing is mounted in the hub by having its externally threaded free end 152 anchored in the threaded portion 54 of the hub. When so mounted, an O-ring 154 is disposed about a plain cylindrical peripheral portion of the bushing 146 formed between the threaded end 152 and an annular positioning flange 156 thereof to effect a fluid-tight seal. When the switch capsule assembly is fully assembled and mounted on the hub 28 of housing 12, and the cover subassembly is secured to the housing, the switch capsule 144, switch actuating lever 134 and microswitch 106 are generally relatively disposed as illustrated in their solid line positions in FIG. 1. These relative positions may be selectively adjusted and the "set" point of the microswitch, i.e. the point at which it is tripped, may be accurately calibrated primarily by screwing or unscrewing the cover 14 on the housing 12 to thereby vary their relative axial disposition and consequently adjust the initial distance between offset 142 and button 148.

The housing 12 rigidly supports a tubular nozzle 170, which may be made of stainless steel, in its counterbore 46 in position to project into the pressure-regulating chamber 18 when the cap subassembly, to be described, is secured to the housing subassembly.

Cap Sub-Assembly

The cap 16 adjustably supports a pressure-regulating capsule assembly. This assembly comprises a capsule 158 which is constructed in a generally similar manner to that of switch capsule 144. One of the diaphragms of pressure-regulating capsule 158 is apertured and rigidly secured, as by brazing, to the bushing 160 so as to have its aperture aligned with the passage 161 in the bushing whereby the passage communicates with the interior of capsule 158. The bushing 160 includes an externally threaded portion 162 that is adjustably received in the threaded bore portion 88 of the hub 84 and includes a pair of axially spaced outwardly extending annular flanges 164 that are received in the plain bore portion 86 of the hub and arranged to receive an O-ring 166 therebetween, which is in sealing engagement with the bore portion 86 to effect a fluid-tight seal. The other diaphragm of the pressure-regulating capsule 158 has a conical resilient button 168, that may be made of natural or synthetic rubber bonded centrally to it, that is, disposed adjacent to the open free end of a tubular nozzle 170 that is rigidly supported in the counterbore 46 of the housing wall 22 when the cap subassembly is secured to the housing subassembly.

The entire pressure-regulating capsule assembly is selectively axially adjustable in the cap hub 84 by applying an appropriate tool, such as a screw driver, in the kerf 172 formed in the free end of the bushing 160 that extends to the exterior of cap 16 and turning it appropriately to axially advance or retract the bushing, hence the entire pressure-regulating capsule assembly, in the cap hub 84. After being adjusted to the desired position so as to achieve the proper initial dispositional relationship, i.e. axial spacing, between the button 168 and the nozzle 170, the entire pressure-regulating capsule assembly may be retained in the position to which it is adjusted by tightening the jamb nut 174 on the part of bushing threaded portion 162 that projects out of the hub 84. It will, therefore, be apparent that the pressure-regulating capsule assembly may initially be mounted on the cap 16 and that thereafter this cap subassembly may be secured to the housing 12. Then the pressure-regulating capsule assembly may be adjusted to and locked in its desired initial setting during calibration of the entire unit.

When the housing, cover and cap subassemblies are fully assembled, they assume the general relative positions illustrated in FIG. 1.

Integration of Switch and Control Unit and Associated Elements Into Ice Detection and Inducting System The switch and control unit 10 is arranged to receive appropriate tubing for being connected to a source of vacuum and a location to be monitored for the formation of ice, which in the preferred illustrated embodiment of the invention comprise portions of an internal combustion engine. By reference to FIG. 3, the manner of operatively associating unit 10 with an internal combustion engine may be quickly observed. The port 40, which is referred to as the outlet port, is connected to and communicates freely with the engine intake manifold, the source of vacuum, by tubing 176 that is appropriately connected to the engine intake manifold at one of its ends and at its other end to the outlet port 40 by any convenient known pipe fitting construction 178 having a threaded end 180 anchored in the port 40. The port 48, which is referred to as the inlet port, is connected to and freely communicates with the interior of carburetor C, which is the location being monitored for the formation of ice. Tubing 182 is connected at one of its ends by a pipe fitting construction 184 of any convenient known type to the inlet port 48, as by having a threaded end 186 anchored therein. The other end of tubing 182 is connected to a wall of the carburetor C by an appropriate pipe fitting construction 187 of any convenient known type in such a manner that it communicates with the interior of probe tube 188 that is also supported by construction 187. The free end of probe tube 188 is deformed into a probe nozzle 190 and disposed in the vicinity of the usual Venturi constriction 192 formed in the carburetor, which may also include the usual throttle valve 194. The construction of the probe nozzle 190 may be clearly seen in FIGS. 6 and 7, wherein it will be observed that the uniform tubular configuration of the probe tube 188 is flattened at its free end so as to form an elongated slot-like nozzle opening 196. The foregoing completes the integration of the unit 10 into the system and primarily indicates the tubing, nozzle, passages, ports, openings and apertures that provide for the entire air flow circuitry within the unit and the hook-up in the entire system. The electrical circuitry is completed by the electrical cord 102, which has its usual pair of conductor wires 103 connected to a source of electrical power, such as a 12-volt direct current battery, and includes an indicating warning lamp 198 that is electrically connected in one of the wires 103 that may be mounted at a convenient location, such as on the instrument panel in the cockpit of the airplane.

Operation of Apparatus and System

When the switch and control unit 10 is operatively associated with the other components in the system, as illustrated schematically in FIG. 3, it operates to automatically detect and indicate the formation of ice within the carburetor, particularly in the vicinity of Venturi constriction, and more particularly at the open end of nozzle opening 196 of the probe nozzle 190 in the following manner:

The unit 10 operates on the principle of employing vacuum as a primary motivating force and applying it at the outlet port 40 through the tubing 176. Any source of vacuum may be employed; however, when the invention is applied in an internal combustion engine environment, this vacuum may conveniently be obtained from the usual intake manifold of the engine. Therefore, the end of tubing 176 opposite to that which is connected to the outlet port 40 may be attached to the engine intake manifold in any convenient manner to sense and freely transmit the pressure therein. The term "vacuum" as used throughout the description of the operation of the apparatus and system is intended to be a designation of a pressure in a given zone in terms of its relation to ambient pressure, which is the zero reference point, but which is actually a positive pressure of approximately twenty-nine inches of mercury. Therefore, when pressure is designated in terms of inches of mercury vacuum, in a particular zone of the unit, it should be realized that this is only relative to ambient pressure of approximately twenty-nine inches of mercury. Hence, a pressure herein designated as twenty-five inches of mercury vacuum is really in absolute terms a positive pressure of approximately four inches of mercury.

A particular apparatus and system which has been found operationally effective in practice employed the following approximate pressures which will be designated in terms of vacuum measured from ambient and referred to as the description of the overall operation proceeds. The intake manifold pressure, which is applied at the outlet port 40, is approximately twenty-five inches of mercury vacuum. The outlet port 40 communicates through the bores 42, 44 and nozzle 170 with the pressure-regulating chamber 18. The pressure-regulating capsule assembly is constructed and disposed so as to function to automatically increase the pressure in the chamber 18 to approximately twelve inches of mercury vacuum. Pressure regulation is effected in the following manner:

Pressure-regulating capsule 158 is designed so as to inherently normally assume a contracted condition, illustrated in FIG. 1 and in solid lines in FIG. 5, wherein its diaphragms nest and are contiguous. The interior of the capsule 158 is vented to the atmosphere through the bore 161 in the bushing 160, and therefore, senses ambient pressure of approximately zero inches of mercury vacuum. The position of the capsule 158 and its button 168 may be initially selectively adjusted relative to the nozzle 170, as pointed out above, when calibrating the unit, so as to provide for the automatic expansion of the capsule 158 and consequential movement of the button-carrying diaphragm toward the nozzle 170 to close the latter and thereby shut off communication of the engine intake manifold and the chamber 18 on the occurrence of a decrease in pressure in the chamber 18 below twelve inches of vacuum, let us say, at approximately thirteen inches of vacuum. Conversely, if the pressure in chamber 18 increases to, let us say, eleven inches of vacuum the capsule 158 automatically contracts, thereby moving the button 168 off of the nozzle 170 and opening the latter. It will, therefore, be apparent that the nozzle 170 and button 168 comprise, respectively, the valve seat and valve member which automatically respond to the pressure in the chamber 18 to maintain a pressure of twelve inches of vacuum therein by cycling about this pressure. It will also be apparent that automatic pressure regulation results from the pressure differential between the interior and exterior of the capsule 158, the former being produced by ambient pressure, and the latter by a number of factors, primarily the intake manifold pressure and the pressure in switch chamber 20 and inlet port 48, as will become apparent. It will also be apparent that the pressure at which the button 168 opens and closes the nozzle 170 may be adjusted by turning the bushing 160 in either direction to either increase or decrease their axial spacing and consequently the amount of capsule expansion; hence, the amount of pressure in chamber 18, necessary before opening and closing occurs.

The pressure-regulating chamber 18 and the switch chamber 20 are connected by the relatively large diameter passage 60, and freely communicable; therefore, the pressure in each of these chambers is substantially the same during operation, for there is free movement of air between them through the passage 60. Hence the pressure in switch chamber 20 is maintained at approximately twelve inches of mercury vacuum during operation, and this pressure acts on the exterior of switch capsule 144.

Pressure-regulating chamber 18 communicates in a predetermined restricted manner with the inlet port 48 through the port 58, which is of very small diameter and is referred to as a fixed orifice, as its minimum cross sectional area determines the reference from which all other passages, ports, openings, etc. are measured. The inlet port 48 communicates with the interior of the switch capsule 144 through the bores 50 and 52 and passage 150 of the bushing 146, all of which are of larger diameters than the fixed orifice. Therefore, the pressures in the inlet port 48 and within the switch capsule 144 are substantially the same during operation for these zones freely communicate.

The switch capsule 144 is constructed and operates in a generally similar manner to pressure-regulating capsule 158, and is designed to normally assume a contracted condition with its diaphragms contiguous and nesting when there is no pressure differential between its interior and exterior, and to expand upon an interior increase in pressure until a pressure differential of approximately nine inches of mercury occurs. On the occurrence of such a pressure differential, the switch capsule 144 expands fully, causing its diaphragm which carries button 148 to have moved axially toward and into engagement with the offset 142 of the switch actuating lever 134 to stress and deflect the latter from its FIG. 1 full to dotted line positions, and cause its upper end to engage and actuate the actuating button 140 of the microswitch 106 to snap actuate the latter and change its switching condition. On a reduction of the pressure differential between the exterior and interior of the switch capsule 144, the latter contracts, thereby moving its button 148 axially away from the lever 134 and ultimately allowing the microswitch 106, as a result of its inherent built-in operation, to snap to its original switching condition and to return its actuating button 140 to its original position wherein it is poised to be actuated again on the occurrence of the next full expansion of the switch capsule 144. The contracted and expanded conditions of the switch capsule may be observed in FIG. 5, by comparing the full (contracted) and dotted (expanded) line conditions of the capsule (though this figure specifically illustrates pressure-regulating capsule 158, the relative conditions of the switch capsule are substantially the same).

The inlet port 48 communicates through tubing 182 with probe tube 188, the nozzle 190 thereof being located against an interior wall of the carburetor with its open end 196 facing the upstream direction of the carburetor and being located just slightly downstream of the minimum diameter of the Venturi constriction 192. This is the zone in the carburetor which is most likely to have ice form, and therefore, is the logical zone to monitor for the formation of ice. The pressure in the carburetor when the engine is operating is approximately a pressure of one-half to one inch of mercury vacuum. Therefore, there is normally, when no ice has formed around probe nozzle 190, a free flow of air through the probe nozzle opening 196, probe tube 188, tubing 182 and into inlet port 48 and the interior of switch capsule 144. Air bleeds from the inlet port 48 through fixed orifice 58 and into the pressure-regulating chamber 18. The arrangement is such that in normal operation, pressure builds up in the inlet port 48, and therefore, on the interior of the switch capsule 144, because only a small amount of air is permitted to bleed through the fixed orifice 58. The pressure in inlet port 48 is approximately three inches of mercury vacuum, and this is sufficiently greater than the pressure of twelve inches of mercury vacuum automatically maintained in the pressure-regulating chamber 18, and therefore, in the switch chamber 20, to create a pressure differential of approximately nine inches of mercury across the switch capsule, whereby the latter expands fully to actuate the microswitch. As previously pointed out, on full expansion of the switch capsule, the button 148 moves the switch actuating lever 134 to its dotted line position in FIG. 1 and the microswitch button 140 is actuated. As long as the internal combustion engine operates and ice does not form in the carburetor, these relative pressure relationships discussed persist and the switch capsule 148 remains expanded. During this operation, the pressure-regulating capsule 158 automatically expands and contracts to maintain the desired pressure in both the chambers 18 and 20.

When ice begins to form in the carburetor, it builds up around the open end of the probe nozzle 190 and constricts the opening 196 therein. This ice formation is designated by reference character I in FIG. 3. As the ice formation increases, the opening 196 in the probe nozzle 190 eventually seals. The sealing of the probe nozzle opening results, after a sufficient amount of air bleeds from the inlet port 48 through the fixed orifice 58 into the pressure-regulating chamber 18 and switch chamber 20, in a reduction in pressure in the inlet port 48 and within the switch capsule 144 to substantially that pressure which exists in the chambers 18 and 20, namely, approximately twelve inches of vacuum. When the differential pressure between the exterior and interior of the switch capsule 144 diminishes below nine inches of mercury, the switch capsule begins to contract, and when the pressure differential reaches zero, it is completely contracted. The switch actuating lever 134, on the occurrence of sufficient contraction of the switch capsule, returns to its original unstressed solid line position shown in FIG. 1 from its deflected stressed dotted line position shown therein, as a result of the inherent stored energy which results from its original stressing and deflection. Movement of the lever 134 to its solid line position permits the microswitch 106 to snap, as a result of its inherent operation, and change its switching condition. As long as ice blocks probe nozzle opening 196, these pressure relationships exist and switch capsule 144 remains contracted. When the ice I is melted and the probe nozzle opening 196 is freed thereof so that its opening is larger in cross sectional area than that of the fixed orifice 58, the pressure in the inlet port 48 and on the interior of the switch capsule builds up again and eventually a pressure differential of nine inches of mercury is reached and the switch capsule fully expands to move the switch actuating lever and again actuate the microswitch.

The foregoing description of the operation of the switch and control unit 10 as applied in a carburetor icing detection and indicating system has involved principally a discussion of the various pressure relationships in and hence air flow paths in important portions of the apparatus under different conditions of icing in the carburetor. It will be understood by those skilled in the art that the microswitch 106 may be electrically wired so as to include an indicating warning lamp 198, and the switch 106 may be initially set so that its switch contacts are normally closed, and therefore, the indicating lamp 198 is illuminated, whenever the switch capsule 144 is in contracted condition, and the switch actuating lever 134 is in its solid line FIG. 1 position. Therefore, when the ignition is turned on, the indicating lamp 198 illuminates, because the engine at this time is not operating, and therefore, the pressure across the switch capsule is equal, hence, the switch capsule is contracted and the microswitch is closed. On starting the engine, the indicating lamp 198 is extinguished, and this informs the operator that the switch and control unit 10 and the entire apparatus and system are working properly, because it results from the pressure in the engine intake manifold inducing a flow of air through the apparatus and system which results in the creation of a sufficient pressure differential across the switch capsule to expand it and thereby force the switch actuating lever 134 to its dotted line position in FIG. 1, wherein it has contacted microswitch button 140 and snapped the microswitch to its switch contacts open condition. As long as ice does not form in the carburetor, the indicating lamp 198 will remain extinguished, for the microswitch remains opened. When ice I forms in the carburetor C, it normally occurs initially at the Venturi construction 192, because this is the portion of the carburetor wherein the carburetor intake air has its velocity increased and its pressure reduced, and this results in a decrease in temperature. When sufficient ice is formed on the probe nozzle 190 so as to reduce its opening 196 to a cross sectional area less than that of the fixed orifice 58, as described above, the pressure is reduced in the inlet port 48 and on the interior of the switch capsule 144, and the pressure differential across the switch capsule diminishes, ultimately resulting in the contraction of the switch capsule and movement of the switch actuating lever 134 away from the microswitch button 140, allowing the microswitch to snap back to its switch contacts closed position wherein the indicating lamp 198 is energized and illuminated. At this time, the operator is warned of the ice formation and may manually activate appropriate de-icing equipment of any known convenient type for melting the ice. It will be understood, however, that if desired, such de-icing equipment may be electrically operated and automatically controlled and activated by the microswitch 106, by being wired into the circuitry so as to be energized whenever the microswitch is closed. For example, an electrical heater (not shown) may be disposed about the carburetor C and be wired into the circuitry so that on closing of the microswitch 106 the heater is energized to warm up the carburetor and melt the ice, and on opening of the microswitch 106 the heater is de-energized.

It will be apparent from the foregoing description of the operation of this system that it is important to maintain certain dimensional relationships in order to achieve the desired operation and to produce the various pressure relationships. It has been found in practice that it is important that the fixed orifice 58 have a cross-sectional area that is less than that of the opening 196 in the probe nozzle 190 and that the ports 50 and 52 and passage 150 in bushing 146 be sufficiently large to cause the interior of the switch capsule 144 to instantaneously sense the same pressure as that which exists in the inlet port 48; hence, these bores and passage are relatively large relative to both the fixed orifice 58, the tubing 182, and the probe nozzle opening 196. The smallest of the bores 42, 44 and the opening in the nozzle 170 must have a cross sectional area that is substantially larger than that of the fixed orifice 58, and the passage 60 must have a cross sectional diameter that is larger than that of the smallest of the bores 42, 44 or the opening in the nozzle 170. One particularly effective embodiment of the invention which operated successfully had the following dimensions: The outlet port 40 and inlet port 48 had diameters of .25 inch; the nozzle 170 had an opening with a diameter of .093 inch; the passage 60 had a diameter of .125 inch; the fixed orifice 58 had a diameter of .04 inch, and the probe tubing 188 had an internal diameter of .073 inch. In practice, the squeezed nozzle 190 was found to be significantly more sensitive to ice formation than if the probe tubing 188 were left cylindrical. The optimum dimension of the slot-like opening in the probe nozzle 190 in the above example of a successfully operated embodiment was one having a width of .03 inch and a length of .125 inch.

It should be clearly understood that as long as the relative basic dimensional relationships which produce the desired pressure relationships are maintained, the specific dimensions set forth in the illustrative example may be varied slightly. Also it should be understood that the finite pressure values discussed above may also be varied as long as the relative relationships exist. It will be further apparent that, although the invention has been described in detail with regard to detecting and indicating ice formations in a carburetor, it may be employed to detect ice formations at other locations, for example, on exposed portions of aircraft, by disposing the probe nozzle 190 at the location being detected. It will also be apparent that sources of vacuum other than the engine intake manifold may be employed, but that this is an extremely convenient source when the invention is applied to an internal combustion engine. Notwithstanding the foregoing modifications and variations that may be indulged in, it should be clearly understood that it is the application of this apparatus in a carburetor icing detection system for an internal combustion engine which employs the pressure in the engine intake manifold as a source of vacuum, and particularly to such an engine employed in aircraft, which is the preferred embodiment of the invention. When so applied, the invention possesses an advantage that may not be apparent, in that the capsules 144 and 158 are capable of withstanding sudden pressures caused by engine backfiring without being damaged. On the occurrence of such backfiring, the sudden increase in pressure is felt in both chambers 18 and 20, hence on the exterior of both capsules 144 and 158; however, no damage results, because the capsules are constructed to contract and have their diaphragms nest without rupturing.

As will be evident from the foregoing description, certain aspects of our invention are not limited to the particular details of construction of the examples illustrated, and we contemplate that various and other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. In an ice detection apparatus, the combination comprising: passage means having a single probe opening disposed at a location where ice is likely to form and for normally permitting air to flow into said opening and through said passage means; a switch and control unit including a switch chamber; means for maintaining a predetermined pressure in said switch chamber lower than the pressure of the air flowing through said passage means; an expansible and contractible switch control member mounted in and subject on one side thereof to the pressure in said switch chamber; said passage means connecting the other side of said member with said opening whereby it is subject to the pressure of the air flowing through said opening which is normally higher than that which is maintained in said switch chamber and thereby expands said member whenever air flows freely through said opening; and means for continuously bleeding a small amount of the air flowing through said opening including an orifice of smaller cross-sectional area than that of said opening, whereby on the formation of ice about said opening the latter is constricted and the flow of air therethrough is restricted and on said opening being constricted to the point where its cross-sectional area is less than that of said orifice, more air bleeds out of said passage means than enters into said opening and the pressure on said other side of said member diminishes and ultimately equalizes with the predetermined pressure in said switch chamber and said member contracts; whereby the expanded condition of said member corresponds to a non-icing condition and the contracted condition corresponds to the icing condition.

2. The combination defined in claim 1 wherein said passage means comprises tubing and said opening is slot-like and formed by a flattened end of said tubing.

3. The combination defined in claim 1 wherein said means for maintaining a predetermined pressure in said switch chamber comprises a source of vacuum and pressure regulating means in said unit arranged to automatically maintain the pressure in said switch chamber by periodically placing said source of vacuum and said switch chamber into communication with each other.

4. The combination defined in claim 3 wherein said pressure regulating means comprises a pressure regulating chamber formed in said unit, a passage permanently connecting said pressure regulating chamber and said switch chamber, and means for intermittently connecting said source of vacuum and said pressure regulating chamber including a passage connecting said source of vacuum and said pressure regulating chamber and an expansible and contractible member disposed in said pressure regulating chamber and arranged to intermittently open and close said last-named passage in response to fluctuations in pressure therein.

5. The combination defined in claim 4 wherein said last named passage is formed in part in a nozzle that projects into said pressure regulating chamber; said member in said pressure regulating chamber comprises a capsule having its interior vented to atmosphere; and a button is carried on the exterior of said pressure regulating chamber and arranged adjacent said nozzle whereby on expansion of said pressure regulating member said button contacts said nozzle and closes its passage.

6. The combination defined in claim 4 wherein said bleeding means bleed into said pressure regulating chamber.

7. The combination defined in claim 1 wherein said member comprises a capsule having its interior in free communication with said passage means and in its exterior subject to the pressure in said switch chamber.

8. The combination defined in claim 7 wherein said capsule comprises a pair of flexible diaphragms that are secured together at their peripheries and which normally assume a contracted condition wherein they nest when there is no pressure differential between their interior and exterior, but which expand on the occurrence of a predetermined pressure differential therebetween.

9. For use in an ice detection apparatus, a switch control unit comprising: a casing having a switch chamber and a pressure regulating chamber; a passage connecting said chambers whereby the pressures therein remain substantially equal; an outlet port adapted to have tube means that communicates with a source of vacuum connected thereto; said outlet port communicating with said pressure regulating chamber; means in said pressure regulating chamber for maintaining the pressure therein at a predetermined level; an inlet port adapted to have tube means that communicates with a location being monitored for the formation of ice connected thereto; said inlet port communicating with said pressure regulating chamber through a small diameter port; an expansible and contractible switch actuating means in said switch chamber and having one side subject to the pressure therein; passage means freely connecting said inlet port with the other side of said switch actuating means and to subject said other side to the pressure in said port; said switch actuating means being arranged to contract whenever the pressure differential across its sides is zero and to expand whenever it reaches a predetermined level.

10. A unit as defined in claim 9 wherein said casing comprises: a housing which includes all of said ports, said passage and said passage means, and supports said switch actuating means; a cover connected to one side of said housing and cooperating therewith to form said switch chamber; and a cap connected to the other side of said housing and cooperating therewith to form said pressure regulating chamber.

References Cited in the file of this patent

UNITED STATES PATENTS

| | | |
|---|---|---|
| 2,208,689 | Sulzman | July 23, 1940 |
| 2,250,344 | Alkan | July 22, 1941 |
| 2,338,574 | Cunningham | Jan. 4, 1944 |
| 2,460,165 | Britton | Jan. 25, 1949 |
| 2,744,992 | Spears | May 8, 1956 |
| 2,914,755 | Fraser | Nov. 24, 1959 |

OTHER REFERENCES

L'Aerotecnica, August–September 1939, pages 898–900.